UNITED STATES PATENT OFFICE.

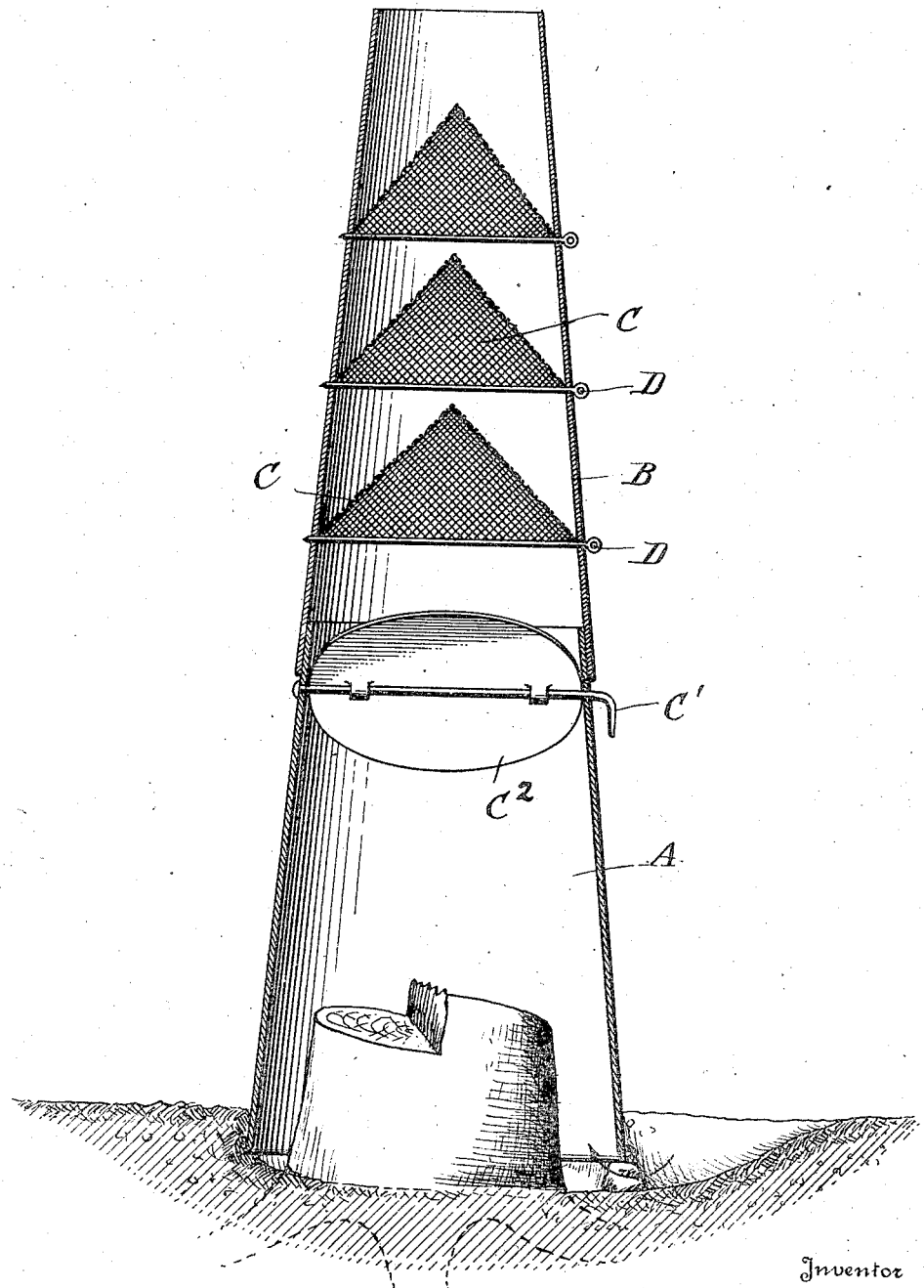

JOHN HENRY HEMPY, OF NEW HAMPSHIRE, OHIO.

STUMP-BURNER.

1,189,568. Specification of Letters Patent. Patented July 4, 1916.

Application filed May 4, 1916. Serial No. 95,474.

*To all whom it may concern:*

Be it known that I, JOHN H. HEMPY, a citizen of the United States, residing at New Hampshire, in the county of Auglaize and State of Ohio, have invented certain new and useful Improvements in Stump-Burners; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for burning stumps and consists essentially in the provision of a casing, open ended and tapering, and adapted to be fitted over the stump and to confine the fire about the stump and produce a draft, suitable spark arresters being provided to prevent the spark passing out the exit end of the casing.

The invention comprises various details of construction, combinations and arrangements of parts which will be hereinafter fully described, shown in the accompanying drawing and then specifically defined in the appended claim.

My invention is illustrated in the accompanying drawing in which I have shown a vertical central sectional view of my stump burning device adjusted in position for use over a stump.

Reference now being had to the details of the drawing by letter, A designates a lower section of the device which is tapering and open at both ends and is adapted to be positioned about the stump, a portion of the ground about the lower end first being recessed away in order to permit a draft underneath the casing. A superimposed section B, conical in form and open-ended, telescopes over the lower section and is provided with rods D, held horizontally in apertures in the walls thereof and which support a spark arrester C. A damper $C^2$ is positioned within the lower section and is mounted upon a rocking shaft $C'$ and affords means for regulating the draft.

In operation, the device is placed over the stump in the manner shown and the stump ignited, the chimney-like sections forming a draft whereby the stump may be readily consumed, the draft being regulated by the damper and the spark arresters serving to hold any sparks which might be drawn through by the draft.

What I claim to be new is:—

A stump burning device consisting of a casing made up of telescoping shells, a damper pivotally mounted near the upper end of one section, a series of rods held transversely in diametrically opposite apertures in the other shell and conical-shaped screens supported by said rods and their marginal edges engaging the inner surface of the shell in which they are supported, said screens being arranged concentrically with slight spaces intervening between the same.

In testimony whereof I hereunto affix my signature in presence of two witnesses.

JOHN HENRY HEMPY.

Witnesses:
R. E. STOCKER,
J. T. BOGART.